July 7, 1936. R. THORNTON 2,047,088
AUXILIARY DRIVE AXLE ATTACHMENT FOR MOTOR VEHICLES
Original Filed Jan. 22, 1932 4 Sheets-Sheet 1

INVENTOR
Ray Thornton
BY
ATTORNEYS

July 7, 1936.                R. THORNTON                2,047,088
           AUXILIARY DRIVE AXLE ATTACHMENT FOR MOTOR VEHICLES
                Original Filed Jan. 22, 1932    4 Sheets-Sheet 2

INVENTOR
Ray Thornton
BY
ATTORNEYS

July 7, 1936.  R. THORNTON  2,047,088
AUXILIARY DRIVE AXLE ATTACHMENT FOR MOTOR VEHICLES
Original Filed Jan. 22, 1932   4 Sheets-Sheet 3

INVENTOR
Ray Thornton
BY
ATTORNEYS

INVENTOR
Ray Thornton

Patented July 7, 1936

2,047,088

UNITED STATES PATENT OFFICE 2,047,088

AUXILIARY DRIVE AXLE ATTACHMENT FOR MOTOR VEHICLES

Ray Thornton, Dearborn, Mich., assignor to Patent Developers, Inc., Detroit, Mich., a corporation of Michigan Application January 22, 1932, Serial No. 588,069
Renewed May 26, 1936

12 Claims. (Cl. 180—22)

The present invention pertains to a novel auxiliary axle attachment for motor vehicles of a type particularly adapted for converting a conventional four wheel vehicle into a six wheel vehicle and thereby increasing the load carrying capacity and driving traction.

The primary object of the present invention is to provide an attachment for motor vehicles by means of which an auxiliary driving and load carrying axle may be conveniently installed upon conventional motor vehicles such as trucks to increase the load carrying capacity thereof by distributing the weight of the load over six wheels instead of four and by increasing the driving traction by propelling the vehicle through four wheels instead of two.

Another object of the present invention is to provide a driving means for motor vehicles which includes means for attaching and driving an auxiliary axle in a manner whereby both the conventional and auxiliary axles are driven through differential gearing that permits turning of the vehicle without damaging the driving mechanism or tires, the gearing also being capable of changing the rate of speed at which the axles are driven when the propeller shaft is driven at a given rate of speed. This feature permits the speed of the vehicle to be changed to suit various loads, being especially designed to permit a greater vehicle speed when traveling without a load or with a comparatively light load after the completion of a long distance haul.

Another object of the present invention is to provide a differential driving mechanism for the conventional live axle of a motor vehicle and an auxiliary live axle that operates in combination therewith, the driving mechanism including a power take-off that permits the power of the vehicle motor to be utilized for driving various kinds of tools, machinery or compressors that are carried by said vehicle or entirely separate therefrom.

Another object of the present invention is to provide a novel means for supporting a conventional live axle, an auxiliary driving axle, and a differential driving means for both of said axles in a manner whereby the auxiliary unit may be conveniently installed and readily removed for the purpose of repairs, the supporting means including springs that permit freedom of movement of the axles such as ordinarily result from surface irregularities in the road and which evenly distribute the load to the axles regardless of the road irregularities.

With the above and other ends in view the invention consists in matters hereinafter set forth and more particularly pointed out in the appended claims, reference being had to the accompanying drawings, in which Fig. 1 is a plan view illustrating a fragment of a truck, the forward part of the truck being omitted inasmuch as it has no bearing on the present invention;

Like characters of reference are employed throughout to designate corresponding parts.

Figure 1:
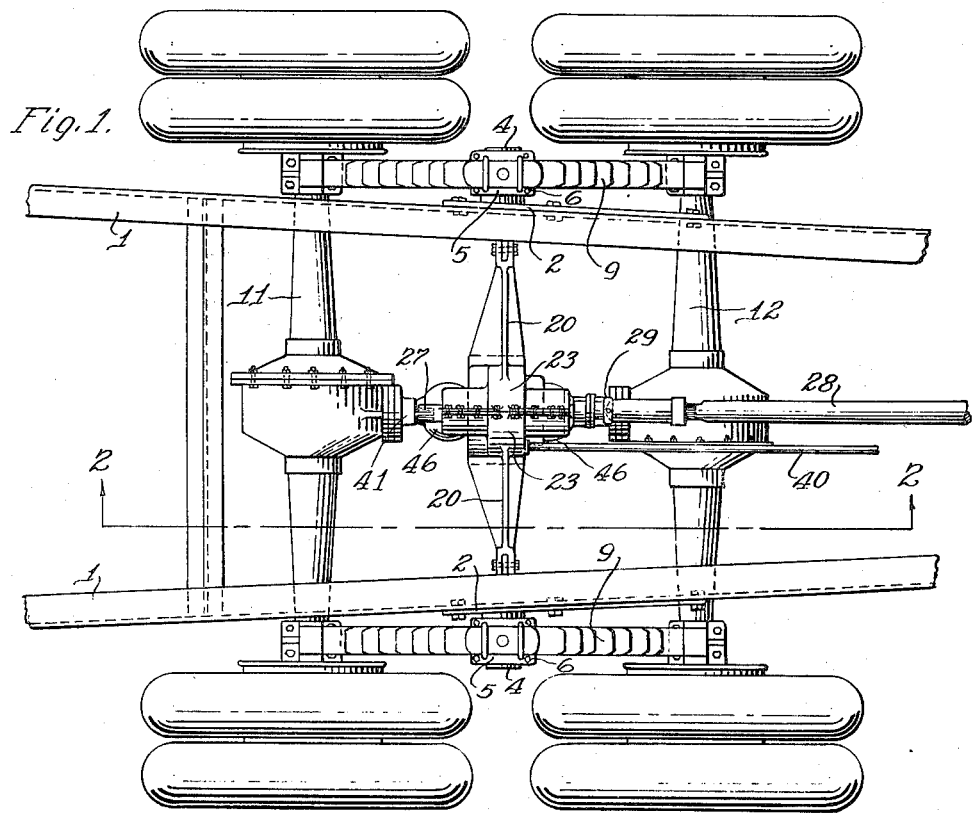
Figure 2:
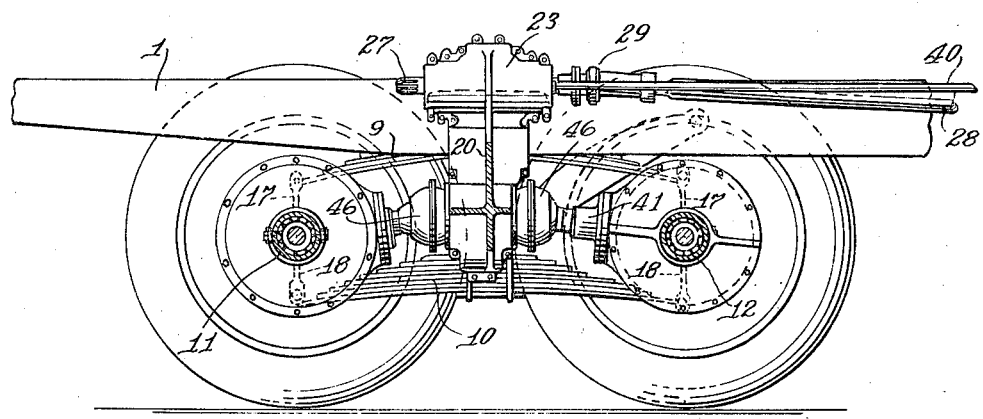
Fig. 2 is a vertical cross sectional view taken along the line 2—2 of Fig. 1.
Figure 4:
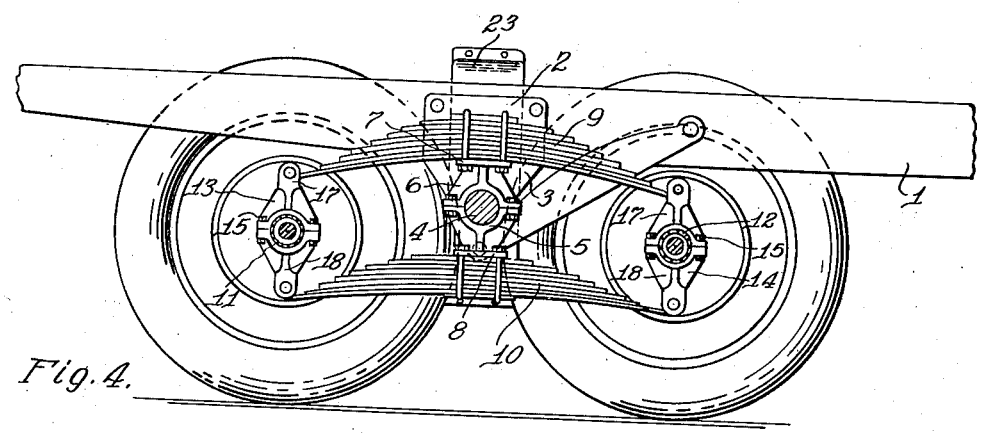
Fig. 4 is a vertical cross sectional view taken along the line 4—4 of Fig. 3.
Figure 3:
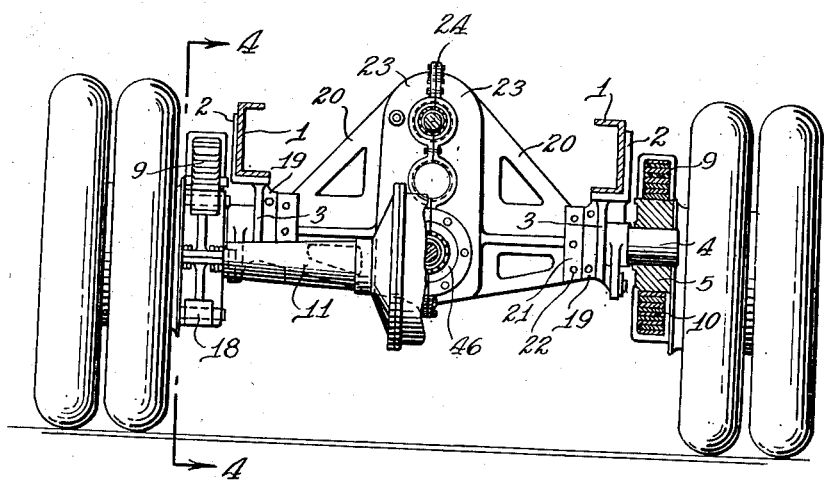
Fig. 3 is an elevation of the rear end of the truck, being partly broken away and in cross section.

The numeral 1 represents the chassis frame of any conventional motor vehicle or truck having the usual engine, transmission and steering mechanism located at the front thereof. The particular type of power and steering means has no bearing on the present invention and is therefore omitted entirely from the drawings and description.

Secured adjacent the rear end of the frame or chassis 1 on opposite sides thereof are brackets 2 having depending flanges 3 which support outwardly projecting stub shafts 4. Mounted on the stub shafts 4 to rotate thereon are brackets 5 which are formed in two sections and bolted together as at 6. Each bracket 5 is equipped with portions 7 and 8 spaced outwardly above and below the same respectively. To the portions 7 are secured leaf springs 9 and to the lower portions 8 are secured the leaf springs 10. In this manner it becomes possible for the springs 9 and 10 to rotate bodily around the stub shafts 4.

A pair of duplicate conventional motor vehicle rear axles are provided in the present construction and the numerals 11 and 12 indicate the axle housings. Adjacent the outer ends of the axle housings 11 and 12, respectively, are rotatably secured brackets 13 and 14, each bracket being formed in two sections which are bolted together as at 15. The brackets 13 and 14 are provided with radially extending arms 17 and 18 to which the springs 9 and 10 are respectively attached. In this manner the two axle housings 11 and 12 are attached to the frame 1 through the springs 9 and 10 which are mounted upon the stub shafts 4 carried by the brackets 2.

On the inner faces of the brackets 3 which are integral with the brackets 2 are formed inwardly projecting flanges 19. Joining the two flanges 19 and extending across the vehicle frame in a manner to reinforce the same are a pair of members 20 which are provided with slotted portions 21 to receive the flanges 19. Bolts 22 securely attach the members 20 to the flanges 19 as is clearly shown in Figs. 6 and 7. The two members 20 are formed with box-like portions 23 having flanges 24 by means of which the two sections may be conveniently attached together to form an enclosing and supporting casing for the driving mechanism which is to be presently described.

By forming the driving mechanism casing in two parts in the manner described, it facilitates rapid assembly of the driving unit contained therein as well as repairs or replacements of parts of the mechanism. By mounting the casing on the brackets 2 in this manner it becomes possible to manufacture the unit on a scale that may be used on various sized trucks, the only adaptation that is required being to lengthen or shorten the flanges 19 that are provided on the brackets 2.

Bearing races 25 are mounted in the upper portion of the joined casing sections 23 and supported therein is a shaft 26 having its ends projecting outwardly through the end walls of the casing. The shaft 26 is splined as at 27, which is the rear end thereof, in order that it may support a pulley, gear or any other means for transmitting rotation to other machinery either carried by the truck or entirely separate therefrom. In other words, the splined portion 27 serves as a power take-off inasmuch as the shaft 26 is driven directly from the engine of the truck (not shown) by means of a conventional propeller shaft 28 which is connected to the opposite or forward end of the shaft 26 by a telescoping universal joint 29.

Intermediate the ends of the shaft 26 is formed a groove 30 in which is mounted a ring 31 that serves as a spacer and backing for a pair of spur gears 32 and 33 which are mounted on said shaft 26 on opposite sides of said ring. Friction reducing bearings 34 are preferably interposed between the shaft 26 and the spur gears 32 and 33 in order that the latter may freely rotate on said shaft.

An internal clutch member 35 is secured on the outer face of the spur gear 32 and is adapted to mesh with an external clutch member 36 which is splined to the shaft 26 in a manner to rotate therewith and slide longitudinally thereon. When the external clutch member 36 is moved longitudinally so that it meshes with the internal clutch member 35 it establishes a driving connection between the shaft 26 and spur gear 32 so that the latter rotates with said shaft. Similarly, an internal clutch member 37 is mounted on the outer face of the spur gear 33 and an external clutch member 38 is splined on the shaft 26 in a manner to rotate therewith and slide longitudinally thereon into or out of engagement with the internal member 37. The external clutch member 38, when meshing with the internal clutch member 37, establishes a driving connection between the shaft 26 and the spur gear 33 so that the latter rotates with said shaft.

Figure 5:
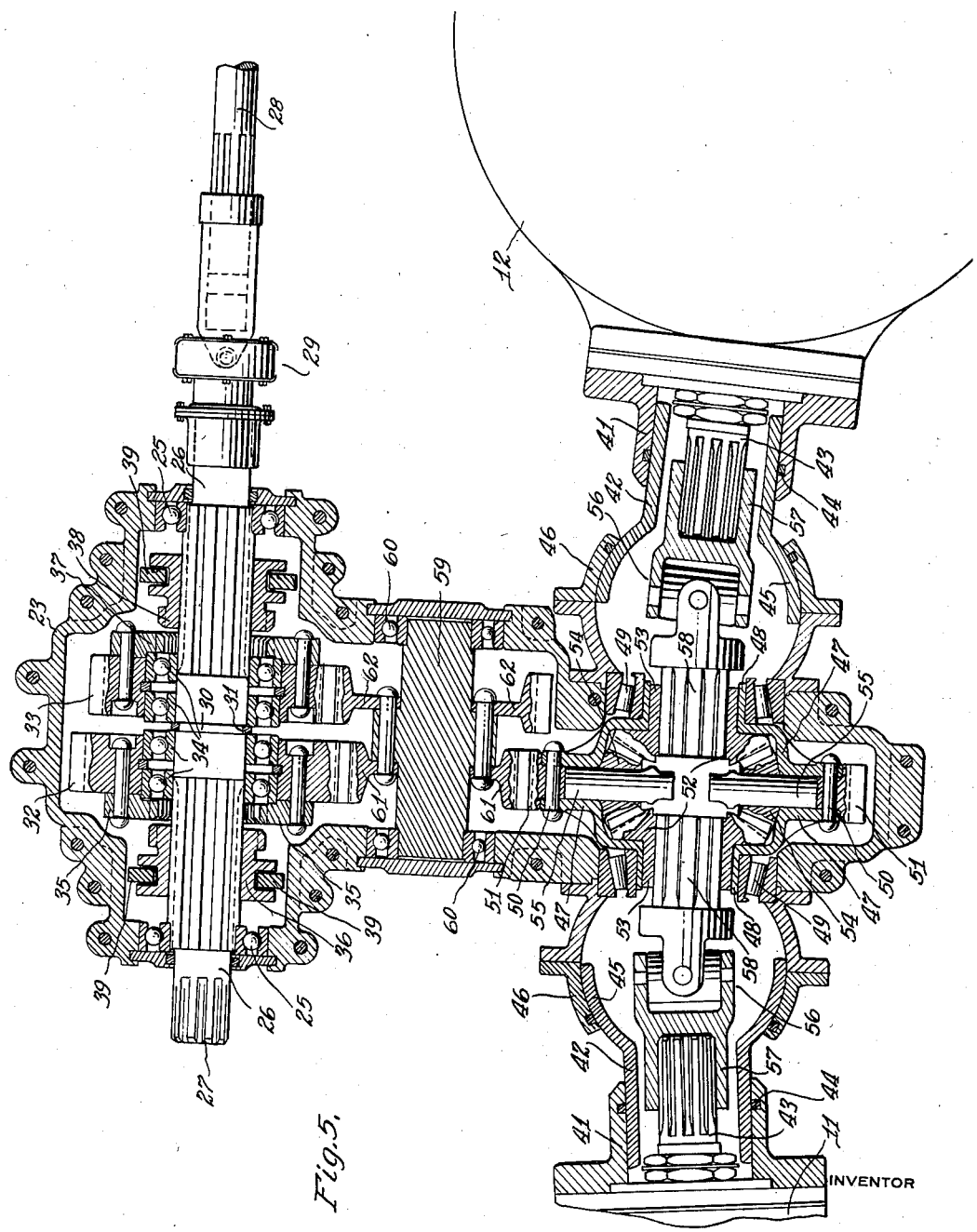
Fig. 5 is a vertical cross sectional view illustrating the differential driving means for the dual axles.

Fork members 39 engage the external clutch members 36 and 38 and the fork members are rigidly spaced apart so that the two clutch members remain the same distance apart during all conditions of operation. As shown in Fig. 5, the two external clutch members may both be out of engagement with their adjacent internal clutch members at the same time, in which case neither spur gear 32 nor 33 can be driven, but in no case can both external clutch members engage their adjacent internal clutch members at the same time. To operate the fork members 39 there is provided a connecting rod 40 that extends to the forward end or control cabin of the vehicle.

The axle housings or casings 11 and 12 are provided with cylindrical sockets 41 which slidably receive the ends of tubular casings 42 into which splined shafts 43 extend from the differential gearing in said axle casings 11 and 12. Packing rings 44 are provided in said sockets 41 to prevent leakage of the lubricant that is usually provided in rear axles. The outer ends of the tubular casings 42 are provided with semispherical heads 45 which are received in spherically shaped sockets 46 bolted or otherwise secured to the casing 23.

A differential case is formed of a pair of plates 47 which are hollowed to receive differential gears, each plate having outwardly projecting hollow bosses 48 which are rotatably received in bearings 49 supported in the box-like casing 23. The plates 47 are bolted or riveted together as at 50 and a ring gear 51 is secured to said plates by interposing a portion thereof between said plates and passing the rivets or bolts therethrough.

Bevelled side gears 52 are provided with bosses 53 which are received in the hollow bosses 48 of the plates 47 in a manner to rotatably support said side gears within the differential case formed by said plates. Bevelled pinion gears 54 are supported on stub shafts 55 which are rigidly mounted in said differential case. Universal joints 56 are provided within the semispherical sockets 45, each universal joint including a socket 57 which is received on the shaft 43 and a stub shaft 58 which is received in the boss 53 of the side gear 52.

Between the shaft 26 and the differential case 47 is rotatably mounted a shaft 59, the ends thereof being received in bearings 60 which are supported in the box-like casing 23. Bolted to the shaft 59 are a pair of spaced spur gears 61 and 62, the gear 61 meshing with the spur gear 32 and the ring gear 51, and the gear 62 meshing with the spur gear 33.

Figure 6:
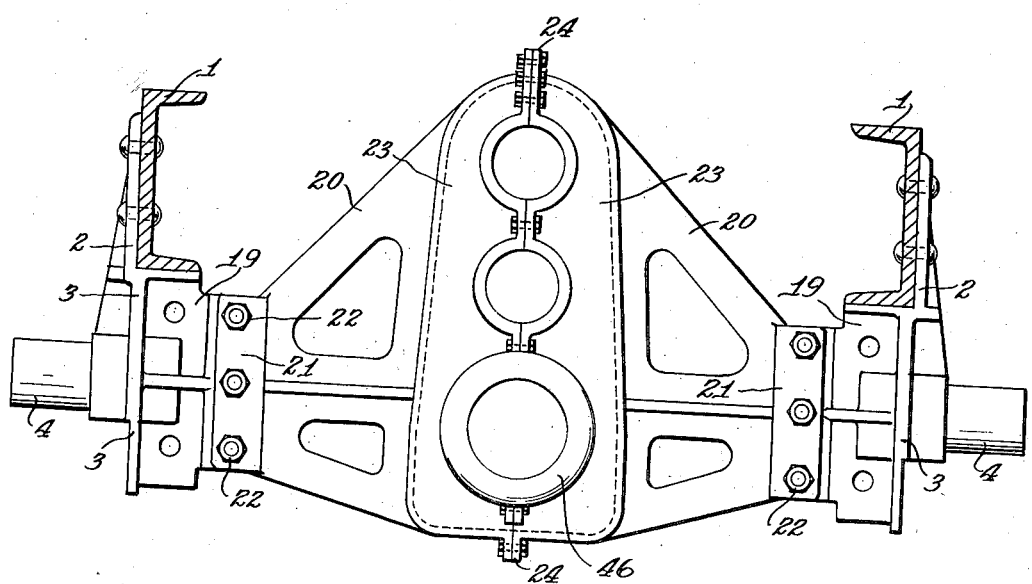
Fig. 6 is an end elevation of the auxiliary differential drive casing, illustrating the frame in cross section.
Figure 7:
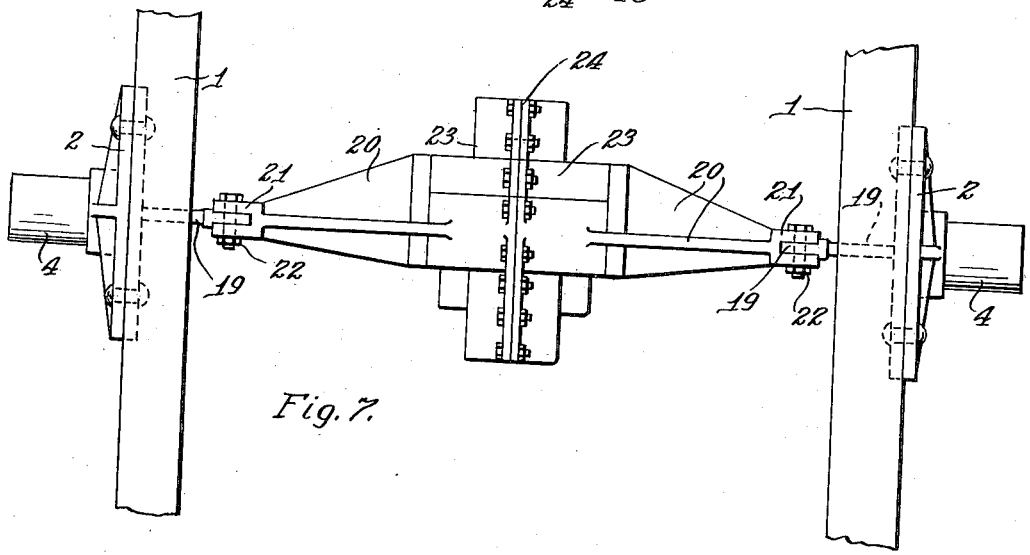
Fig. 7 is a top plan of the casing.

As clearly illustrated in Figs. 6 and 7, the box-like casing which encloses the differential and change speed gearing transmitting the power from the drive shaft 28 of a motor vehicle to a pair of rear axles 11 and 12 is formed of two sections 23 which are bolted together in a manner that conveniently permits assembly or tearing down for the purpose of repairs. The sections when bolted together form a unit which may be installed in any truck regardless of frame size by merely providing brackets 2 that have flanges 19 of the required length.

When the unit is installed on a truck and connecting two conventional rear axle assemblies in the manner above described, the shaft 26 is rotated by the propeller shaft 28 which is in turn driven by the motor of the vehicle. In the position illustrated in Fig. 5, rotation of the shaft 26 has no effect on the remainder of the gearing which remains stationary. In this position the splined portion 27 of the shaft 26 may serve to drive any machinery or appliances carried by the truck or separate therefrom.

When it is desired to drive the rear axles, rotation of the propeller shaft 28 is stopped by employing the usual clutch and transmission which form part of conventional motor vehicles. The external clutch member 36 is then moved into engagement with the internal clutch member 35. When the shaft 28 is again rotated the spur gear 32 is rotated with the shaft 26 as a result of the driving connection which is established by engagement of the two clutch members 36 and 35. Rotation of the shaft 26 is transmitted from the spur gear 32 to the spur gear 61 which meshes with the gear 51 and thereby causes rotation of the differential case 47. The differential case transmits the rotation through the pinion gears 54 to the side gears 52 which in turn drive the rear axles through the shafts 58, universal joints 56, sockets 57 and stub shafts 43. The manner in which the gears 52 and 54 operate to permit different speeds of rotation of the shafts 43 at the same time is well known to those skilled in the motor vehicle art and need not be described in detail.

When the rear axles are driven in the manner above described through the spur gear 32 the axles are operating under high speed gearing which is suitable for light loads or on return trips after long hauls. When it is desired to haul heavy loads the driving mechanism is operated through the spur gear 33. To operate through the spur gear 33 the external clutch member 38 is moved into contact with the internal clutch member 37 which causes the spur gear 33 to rotate with the shaft 26. Rotation is transmitted from the spur gear 33 to the gear 62 which is secured on the shaft 59, and, inasmuch as the gear 61 is also secured on the shaft 59, said latter gear rotates therewith and drives the differential case in the manner above described.

The casings 23, when secured to the brackets 2 by the bolts 22, rigidly tie the two side members of the frame 1 together and support the differential gearing and the change speed gearing in definite relation to the frame 1 and brackets 2. The same brackets 2 support the springs 9 and 10 by means of brackets 5 which are formed in two sections in order that they may be conveniently installed and removed and which are supported in a manner whereby they may rotate on the stub shafts 4 of said brackets 2, this rotary movement being essential in order to attain the desired functioning of the springs 9 and 10. The outer ends of the springs are secured to the brackets 15, and these brackets are also rotatable on the axle housings 11 and 12 so that said axles may raise or lower as a result of road inequalities, the shocks of which are absorbed by said springs. A further advantage of the rotatable brackets 5 and 15 is that the front axle 12 may raise considerably and the rear axle 11 lower considerably, or vice versa, without distorting or straining the springs 9 and 10 which always remain substantially parallel to each other. In other words, any inclination of one of the springs 9 or 10 is accompanied by an identical inclination of the other spring.

The present construction has a further advantage in that the springs 9 and 10 serve as radius rods to maintain the axles 11 and 12 at right angles to the direction in which they are to travel and at the same time permit the axles to be inclined at an angle relative to a horizontal plane. In order to permit this latter movement and still maintain a driving connection between the differentials in the axles 11 and 12 and the differential in the casing 23, there are provided the above described telescoping members 43 and 57 and the universally swivelling members 45 and 46. The latter connections permit the axles 11 and 12 to move freely in any direction, the only restraining elements being the springs 9 and 10 which are also the only elements tying the two axles 11 and 12 to the differential drive in the casings 23 and preventing withdrawal of the stub shafts 43 from the sockets 57.

Although a specific embodiment of the present invention has been illustrated and described, it is to be understood that various changes may be made in the details of construction without departing from the spirit of the invention and such changes are contemplated.

What is claimed is:

1. The combination with a motor vehicle frame, of brackets secured thereto on opposite sides thereof, springs mounted on said brackets, rear axle assemblies mounted at the forward and rear ends of said springs, a pair of cross members having their outer ends secured to said brackets and their inner ends formed with box-like casings adapted to be bolted together to form a housing rigidly secured to the opposite frame members, differential gearing mounted in said housing and operatively connected to said rear axle assemblies, a change speed gearing mounted in said housing and having a driving connection with said differential, and means for selectively operating said change speed gearing.

2. The combination with a motor vehicle frame, of brackets secured thereto on opposite sides thereof, springs mounted on said brackets, rear axle assemblies mounted at the forward and rear ends of said springs, a pair of cross members having their outer ends secured to said brackets and their inner ends formed with box-like casings adapted to be bolted together to form a housing rigidly secured to the opposite frame members, differential gearing mounted in said housing and operatively connected to said rear axle assemblies, a driven shaft mounted in said housing, gears loosely mounted on said shaft and in driving connection with said differential, and means mounted on said shaft for selectively engaging and driving said gears.

3. The combination with a motor vehicle frame, of brackets secured thereto on opposite sides thereof, springs mounted on said brackets, rear axle assemblies mounted at the forward and rear ends of said springs, a pair of cross members having their outer ends secured to said brackets and their inner ends formed with box-like casings adapted to be bolted together to form a housing rigidly secured to the opposite frame members, differential gearing mounted in said housing and operatively connected to said rear axle assemblies, and a selective change speed gearing contained in said housing and operatively connected to said differential gearing.

4. A dual axle assembly for motor vehicles comprising a pair of brackets adapted to be mounted on opposite sides of a vehicle frame, downwardly projecting flanges formed on said brackets, outwardly projecting stub shafts formed on said flanges, springs mounted on said stub shafts, rear axle assemblies supported at the front and rear ends of said springs, inwardly projecting flanges formed on said brackets, a box-like casing formed in two parts adapted to be bolted together to form a housing and having outwardly projecting members secured to said inwardly projecting flanges, and a differential drive gearing mounted in said box-like casing and operatively connected to said rear axle assemblies.

5. A dual axle assembly for motor vehicles comprising a pair of brackets adapted to be mounted on opposite sides of a vehicle frame, downwardly projecting flanges formed on said brackets, outwardly projecting stub shafts formed on said flanges, springs mounted on said stub shafts, rear axle assemblies supported at the front and rear ends of said springs, inwardly projecting flanges formed on said brackets, a box-like casing formed in two parts adapted to be bolted together to form a housing and having outwardly projecting members secured to said inwardly projecting flanges, a differential gearing mounted in said housing and operatively connected to said rear axle assemblies, and selective change speed gearing mounted in said casing and adapted to drive said differential gearing.

6. A dual axle assembly for motor vehicles comprising a pair of brackets adapted to be mounted on opposite sides of a vehicle frame, downwardly projecting flanges formed on said brackets, outwardly projecting stub shafts formed on said flanges, springs mounted on said stub shafts, rear axle assemblies supported at the front and rear ends of said springs, inwardly projecting flanges formed on said brackets, a box-like casing formed in two parts adapted to be bolted together to form a housing and having outwardly projecting members secured to said inwardly projecting flanges, and a selective change speed gearing contained in said housing and operatively connected to said rear axle assemblies.

7. In combination, a vehicle chassis frame, a traction unit including a pair of rear axle assemblies and their wheels and springs connecting and spacing said assemblies, means for pivotally supporting the springs on said frame whereby the unit is bodily movable relatively to the frame in a vertical direction and the assemblies movable relatively in such direction, and drive mechanism carried by the frame and operatively connected with both of the rear axle assemblies with the connections enclosed, said connections and the enclosing structures being extensibly and swingingly arranged to compensate for changes in relative vertical positions of unit and frame with the compensation effective individually to the axle assemblies.

8. A combination as in claim 7 characterized in that the drive mechanism includes a differential gearing operatively connected to both axle assemblies, a change speed mechanism for driving the differential gearing, and a housing for the change speed mechanism and differential gearing, said housing being supported by and movable with the frame, the connections between the differential gearing and the respective axle assemblies having the compensating characteristic.

9. A combination as in claim 7 characterized in that the drive mechanism includes a change speed mechanism operatively connected with both axle assemblies, said mechanism being supported by and movable with the chassis frame.

10. In combination with a motor vehicle frame, a dual rear axle drive unit comprising a pair of bracket members rigidly secured to said frame on opposite sides thereof, a pair of driving axles and housings therefor arranged in tandem adjacent said bracket members, springs connected at their ends to said axle housings with the latter rotatable relatively to the spring ends, means including said bracket members for pivotally connecting said springs to the vehicle frame at points intermediate their ends, a gear housing positioned intermediate said axles, cross members carried by said housing for detachably securing the latter to said bracket members, differential gearing mounted in said housing and drivingly connected to said axles, and a change speed gearing also mounted in said housing in driving connection with said differential gearing.

11. In a motor vehicle having a chassis frame with an engine and a transmission mounted adjacent the forward end thereof, the combination of a pair of driving axles and housings therefor arranged in tandem adjacent the rear end of said frame, springs having pivotal connections with said frame at points intermediate their ends and having their ends connected to said axle housings, said housings being rotatable relatively to the ends of said springs, a gear casing rigidly secured to and supported by said frame in a position intermediate said axles, a gear train mounted in said gear casing, means for transmitting power from said engine and transmission to said gear train, means including a pair of extensible, universally jointed driving connections extending from said gear casing to the axle housings for transmitting driving torque from said gear train to said axles, and extensible housings for said driving connections, said housings having universal connections with said gear casing.

12. In a motor vehicle having a chassis frame with an engine and a transmission mounted adjacent the forward end thereof, the combination of a pair of driving axles and housings therefor arranged in tandem adjacent the rear end of said frame, springs having pivotal connections with said frame at points intermediate their ends and having their ends connected to said axle housings, said housings being rotatable relatively to the ends of said springs, a gear casing rigidly secured to and supported by said frame in a position intermediate said axles, a gear train of variable transmission ratio mounted in said gear casing, differential gearing also mounted in said casing and in permanent driven connection with the output end of said gear train, means for transmitting power from said engine and transmission to said gear train, means including a pair of extensible, universally jointed driving connections extending from said gear casing to the axle housings for transmitting driving torque from said differential gearing to said axles, and extensible housings for said driving connections, said housings having universal connections with said gear casing.

RAY THORNTON.